US012600845B2

(12) United States Patent
Tartari

(10) Patent No.: US 12,600,845 B2
(45) Date of Patent: Apr. 14, 2026

(54) PROPYLENE POLYMER COMPOSITION

(71) Applicant: BASELL POLIOLEFINE ITALIA S.R.L., Milan (IT)

(72) Inventor: Davide Tartari, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 869 days.

(21) Appl. No.: 17/911,938

(22) PCT Filed: Mar. 8, 2021

(86) PCT No.: PCT/EP2021/055710
§ 371 (c)(1),
(2) Date: Sep. 15, 2022

(87) PCT Pub. No.: WO2021/197761
PCT Pub. Date: Oct. 7, 2021

(65) Prior Publication Data
US 2023/0151196 A1      May 18, 2023

(30) Foreign Application Priority Data

Mar. 30, 2020      (EP) ..................................... 20166605

(51) Int. Cl.
*C08L 23/12*          (2006.01)

(52) U.S. Cl.
CPC ........... *C08L 23/12* (2013.01); *C08L 2203/30* (2013.01); *C08L 2205/025* (2013.01)

(58) Field of Classification Search
CPC ................ C08L 23/12; C08L 2203/30; C08L 2205/025; C08L 2207/02; C08L 2308/00; C08L 2314/00; C08L 23/16; C08F 10/06; C08F 210/06; C08F 2/001; C08F 110/06; C08F 2500/12; C08F 2500/35; C08F 210/16; C08F 2500/17; C08F 2500/27; C08F 2500/30; C08F 2500/31; C08F 4/6465; C08F 4/651; C08F 4/6492; C08F 4/6574
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 2009/0209706 A1* | 8/2009 | Sheard .................... | C08L 23/12 |
| | | | 526/348 |
| 2013/0211011 A1* | 8/2013 | Gaddi ..................... | C08L 23/14 |
| | | | 525/240 |

FOREIGN PATENT DOCUMENTS

| | | |
|---|---|---|
| CN | 110662801 A | 1/2020 |
| EP | 0728769 A1 | 8/1996 |
| EP | 2072546 A1 | 6/2009 |
| EP | 2075284 A1 | 7/2009 |
| WO | 9844009 A1 | 10/1998 |
| WO | 2008074423 A1 | 6/2008 |
| WO | 2012159927 A1 | 11/2012 |
| WO | 2017013096 A1 | 1/2017 |
| WO | 2017076701 A1 | 5/2017 |
| WO | 2018104092 A1 | 6/2018 |

OTHER PUBLICATIONS

International Search Report and Written Opinion Mailed Apr. 7, 2021 (Apr. 7, 2021) For Corresponding PCT/EP2021/055710.
Li Rangbo et al: "Correlation between chain microstructure and mechanical properties of two polypropylene/poly (ethylene-co-propylene) in-reactor alloys", Colloid & Polymer Science, Springer Verlag, Heidelberg, DE, vol. 293, No. 4, Dec. 20, 2014 (Dec. 20, 2014), pp. 1011-1021, XP035477100, ISSN: 0303-402X, DOI: 10.1007/S00396-014-3483-6 [retrieved on Dec. 20, 2014].

* cited by examiner

*Primary Examiner* — Alicia Bland

(57) ABSTRACT

A polypropylene composition made from or containing:
  A) From 96 wt % to 80 wt %; of a propylene homopolymer having a fraction insoluble in xylene at 25° C. greater than 90 wt %, based upon the total weight of the propylene homopolymer; and a melt flow rate, MFR, measured according to ISO 1133 at 230° C. with a load of 2.16 kg between 80.0 g/10 min and 300.0 g/10 min; and
  B) From 4 wt % to 20 wt %; of a propylene ethylene copolymer having an ethylene derived units content ranging from 18 wt % to 38 wt %, based upon the total weight of the propylene ethylene copolymer;
wherein the polypropylene composition having:
a melt flow rate, MFR, measured according to ISO 1133 at 230° C. with a load of 2.16 kg, between 80.0 g/10 min and 150.0 g/10 min;
the sum of the amounts of A) and B) being 100 wt %.

15 Claims, No Drawings

PROPYLENE POLYMER COMPOSITION

This application is the U.S. National Phase of PCT International Application PCT/EP2021/055710, filed Mar. 8, 2021, claiming benefit of priority to European Patent Application No. 20166605.4, filed Mar. 30, 2020, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a polypropylene copolymer composition.

BACKGROUND OF THE INVENTION

For use in injection molded parts for thin-walled packaging applications such as food packaging and plastic cups, polymeric materials have certain characteristics.

In some instances, propylene-based polymers have characteristics for use in applications such as molded articles as well as in pipes, fittings, and foams.

In some instances, polypropylene products of high stiffness are based on high molecular weight materials. In some instances, those polypropylene products are prepared by adding nucleating agents, thereby starting the crystallization of the polypropylene at a higher temperature and achieving crystallization at a higher speed.

In some instances, to increase the output rate during extrusion, a polymer of high flowability is used. In some instances, the polymer is part of low molecular weight compositions with a low viscosity.

SUMMARY OF THE INVENTION

In general embodiments, the present disclosure provides a polypropylene composition made from or containing:

A) From 96 wt % to 80 wt %; of a propylene homopolymer, based upon the total weight of the polypropylene composition, having
  a fraction insoluble in xylene at 25° C. greater than 90 wt %, based upon the total weight of the propylene homopolymer; and
  a melt flow rate, MFR, measured according to ISO 1133 at 230° C. with a load of 2.16 kg between 80.0 g/10 min and 300.0 g/10 min; and B) From 4 wt % to 20 wt %; of a propylene ethylene copolymer, based upon the total weight of the polypropylene composition, having
  an ethylene derived units content ranging from 18 wt % to 38 wt %, based upon the total weight of the propylene ethylene copolymer;
  wherein the polypropylene composition having:
  i) a xylene soluble fraction at 25° C. ranging from 5 wt % to 13.0 wt %, based upon the total weight of the polypropylene composition;
  ii) the ethylene derived units content on the fraction insoluble in xylene at 25° C. ranging from 0.5 wt % to 3.5 wt %;
  iii) the ethylene derived units content on the fraction soluble in xylene at 25° C. ranging from 17.2 wt % to 27.0 wt %;
  iv) the $C^{13}$ NMR sequences PPE ranging from 3.50 mol % to 5.65 mol % and the $C^{13}$ NMR sequences PEE measured on the fraction soluble in xylene at 25° C. ranging from 7.85 mol % to 11.00 mol %; and (v) a melt flow rate, MFR, measured according to ISO 1133 at 230° C. with a load of 2.16 kg, between 80.0 g/10 min and 150.0 g/10 min;
  the sum of the amounts of A) and B) being 100 wt %.

DETAILED DESCRIPTION OF THE INVENTION

In some embodiments, the present disclosure provides a polypropylene composition made from or containing:
A) from 96 wt % to 80 wt %; alternatively from 95 wt % to 85 wt %; alternatively from 93 wt % to 87 wt %; of a propylene homopolymer, based upon the total weight of the polypropylene composition, having
  a fraction insoluble in xylene at 25° C. greater than 90 wt %; alternatively greater than 94 wt %; based upon the total weight of the propylene homopolymer; and
  a melt flow rate, MFR, measured according to ISO 1133 at 230° C. with a load of 2.16 kg between 80.0 g/10 min and 300.0 g/10 min; alternatively between 100.0 g/10 min and 250.0 g/10 min; alternatively between 150.0 g/10 min and 220.0 g/10 min; and B) from 4 wt % to 20 wt %; alternatively from 5 wt % to 15 wt %; alternatively from 7 wt % to 13 wt %; of a propylene ethylene copolymer, based upon the total weight of the polypropylene composition, having
  an ethylene derived units content ranging from 18 wt % to 38 wt %; alternatively from 22 wt % to 31 wt %; alternatively 25 wt % to 29 wt %, based upon the total weight of the propylene ethylene copolymer; and
  a melt flow rate, MFR, measured according to ISO 1133 at 230° C. with a load of 2.16 kg between 80.0 g/10 min and 150.0 g/10 min; alternatively between 90.0 g/10 min and 130.0 g/10 min; alternatively between 95.0 g/10 min and 120.0 g/10 min;
wherein the polypropylene composition having:
  i) a xylene soluble fraction at 25° C. ranging from 5 wt % to 13 wt %; alternatively from 6 wt % to 12 wt %; alternatively from 7 wt % to 11 wt %; based upon the total weight of the polypropylene composition;
  ii) the ethylene derived units content on the fraction insoluble in xylene at 25° C. ranging from 0.5 wt % to 3.5 wt %; alternatively from 0.8 wt % to 2.5 wt %; alternatively from 1.1 wt % to 2.1 wt %;
  iii) the ethylene derived units content on the fraction soluble in xylene at 25° C. ranging from 17.2 wt % to 27.0 wt %; alternatively from 17.8 wt % to 21.3 wt %; alternatively from 18.2 wt % to 20.5 wt %;
  iv) the $C^{13}$ NMR sequences PPE ranging from 3.50 mol % to 5.65 mol %; alternatively from 3.80 mol % to 5.00 mol %; alternatively from 4.10 mol % to 4.80 mol %; and the $C^{13}$ NMR sequences PEE measured on the fraction soluble in xylene at 25° C. ranging from 7.85 mol % to 11.00 mol %; alternatively from 8.00 mol % to 10.80 mol %; alternatively from 8.20 mol % to 9.80 mol %; and
  v) a melt flow rate, MFR, measured according to ISO 1133 at 230° C. with a load of 2.16 kg between 80.0 g/10 min and 150.0 g/10 min; alternatively between 90.0 g/10 min and 130.0 g/10 min; alternatively between 95.0 g/10 min and 120.0 g/10 min;
the sum of the amounts of A) and B) being 100 wt %.

As used herein, the term "copolymer" refers to polymers containing two kinds of comonomers, such as propylene and ethylene.

The polypropylene composition is not subjected to a chemical or physical visbreaking, that is, the MFR is obtained with the polymerization process.

In some embodiments, the polypropylene composition has the ratio r1r2 measured with $C^{13}$ NMR between 1.98 and 3.48; alternatively between 2.20 and 2.95.

In some embodiments, the polypropylene composition has the intrinsic viscosity measured on the fraction soluble in xylene at 25° C. ranging from 0.9 to 2.3 dl/g; alternatively from 1.1 to 2.0 dl/g; alternatively from 1.2 to 1.8 dl/g.

In some embodiments, the polypropylene compositions are used to prepare injection-molded articles, alternatively thin-layer injection-molded articles. In some embodiments, the present disclosure provides injection-molded articles, alternatively thin-layer injection-molded articles.

In some embodiments, the polypropylene composition is obtained with a polymerization process in two or more stages wherein component A) is obtained in the first stages and then component B) is obtained in the second stages in the presence of component A). In some embodiments, each stage is in gas-phase, operating in one or more fluidized or mechanically agitated bed reactors, slurry phase using as diluent an inert hydrocarbon solvent, or bulk polymerization using the liquid monomer as a reaction medium. In some embodiments, the liquid monomer is propylene. In some embodiments, component B) is polymerized in a gas phase process in the presence of component A).

In some embodiments, the polymerization is carried out at temperature of from 20 to 120° C., alternatively from 40 to 80° C. In some embodiments, the polymerization is carried out in gas-phase and the operating pressure is between 0.5 and 5 MPa, alternatively between 1 and 4 MPa. In some embodiments, the polymerization is carried out in bulk polymerization and the operating pressure is between 1 and 8 MPa, alternatively between 1.5 and 5 MPa. In some embodiments, hydrogen is used as a molecular weight regulator.

In some embodiments, the polypropylene composition is prepared by a process including the steps of homopolymerizing propylene in a first stage and then copolymerizing propylene with ethylene in a second stage, wherein both stages are conducted in the presence of a catalyst made from or containing the product of the reaction between:

(i) a solid catalyst component made from or containing Ti, Mg, Cl, and at least one electron donor compound containing from 0.1 to 50% wt of Bi with respect to the total weight of the solid catalyst component;

(ii) an alkylaluminum compound; and (iii) an external electron-donor compound having the formula:

$$(R^1)_a Si(OR^2)_b$$

wherein $R^1$ and $R^2$ are independently selected among alkyl radicals with 1-8 carbon atoms, optionally containing heteroatoms, a is 0 or 1, and a+b=4. In some embodiments, the external donor is an ester of glutaric acid, alternatively an alkyl ester of glutaric acid; alternatively the ester of glutaric acid is used in a mixture with 9,9-bis(alkoxymethyl) fluorene. In some embodiments, the molar ratio between esters of glutaric acid and 9,9-bis(alkoxymethyl)fluorene is from 50:50 to 90:10; alternatively from 60:40 to 80:20; alternatively from 65:35 to 75:25. In some embodiments, the alkyl radical is a $C_1$-$C_{10}$ alkyl radical. In some embodiments, the $C_1$-$C_{10}$ alkyl radical is selected from the group consisting of a methyl, ethyl propyl; butyl radicals. In some embodiments, the alkyl ester of glutaric acid is 1 3,3-dipropylglutarate. In some embodiments, the 9,9-bis(alkoxymethyl) fluorene is 9,9-bis(methoxymethyl)fluorene.

In some embodiments and in the catalyst component, the content of Bi ranges from 0.5 to 40% wt, alternatively from 1 to 35% wt, alternatively from 2 to 25% wt, alternatively from 2 to 20% wt, based upon the total weight of the solid catalyst component.

In some embodiments, the particles of the solid component have substantially spherical morphology and an average diameter ranging between 5 and 150 m, alternatively from 20 to 100 m, alternatively from 30 to 90 m. As used herein, the term "substantially spherical morphology" refers to particles having the ratio between the greater axis and the smaller axis equal to or less than 1.5, alternatively less than 1.3.

In some embodiments, the amount of Mg ranges from 8 to 30% wt, alternatively from 10 to 25% wt, based upon the total weight of the solid catalyst component.

In some embodiments, the amount of Ti ranges from 0.5 to 5% wt, alternatively from 0.7 to 3% wt, based upon the total weight of the solid catalyst component.

In some embodiments, the Mg/Ti molar ratio is equal to, or greater than, 13, alternatively in the range of 14 to 40, alternatively from 15 to 40. In some embodiments, the Mg/donor molar ratio is greater than 16, alternatively greater than 17, alternatively ranging from 18 to 50.

In some embodiments, the Bi atoms are derived from one or more Bi compounds not having Bi-carbon bonds. In some embodiments, the Bi compounds care selected from the group consisting of Bi halides, Bi carbonate, Bi acetate, Bi nitrate, Bi oxide, Bi sulfate, and Bi sulfide. In some embodiments, the Bi compounds have the valence state of $3^+$. In some embodiments, the Bi compounds are selected from the group consisting of Bi trichloride and Bi tribromide. In some embodiment, the Bi compound is $BiCl_3$.

In some embodiments, the solid catalyst component is prepared by reacting a titanium compound of the formula $Ti(OR)_{q-y}X_y$, where q is the valence of titanium and y is a number between 1 and q, with a magnesium chloride deriving from an adduct of formula $MgCl_2 \cdot pROH$, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride, operating under stirring conditions at the melting temperature of the adduct (100-130° C.). Then, the adduct is mixed with an inert hydrocarbon immiscible with the adduct, thereby creating an emulsion which is quickly quenched, causing the solidification of the adduct in form of spherical particles. In some embodiments, the procedure for the preparation of the spherical adducts is as disclosed in U.S. Pat. Nos. 4,399,054 and 4,469,648. In some embodiments, the resulting adduct is directly reacted with a Ti compound or subjected to thermally controlled dealcoholation (80-130° C.), thereby obtaining an adduct wherein the number of moles of alcohol is lower than 3, alternatively between 0.1 and 2.5. In some embodiments, the reaction with the Ti compound is carried out by suspending the adduct (dealcoholated or not) in cold $TiCl_4$; the mixture is heated up to 80-130° C. and kept at this temperature for 0.5-2 hours. In some embodiments, the temperature of the cold $TiCl_4$ is 0° C. In some embodiments, the treatment with $TiCl_4$ is carried out one or more times. In some embodiments, the electron donor compound is added during the treatment with $TiCl_4$.

Several ways are available to add one or more Bi compounds in the catalyst preparation. In some embodiments, the Bi compound(s) is/are incorporated directly into the $MgCl_2.pROH$ adduct during the adduct's preparation. In some embodiments, the Bi compound is added at the initial stage of adduct preparation by mixing the Bi compound together with $MgCl_2$ and the alcohol. In some embodiments, the Bi compound is added to the molten adduct before the emulsification step. The amount of Bi introduced ranges from 0.1 to 1 mole per mole of Mg in the adduct. In some embodiments, the Bi compound(s), which are incorporated directly into the $MgCl_2.pROH$ adduct, are Bi halides, alternatively $BiCl_3$.

In some embodiments, the alkyl-Al compound (ii) is selected from the group consisting of trialkyl aluminum compounds, alkylaluminum halides, alkylaluminum hydrides, and alkylaluminum sesquichlorides. In some embodiments, the alkyl-Al compound (ii) is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound (ii) is an alkylaluminum sesquichlorides selected from the group consisting of $AlEt_2Cl$ and $Al_2Et_3Cl_3$. In some embodiments, the alkyl-Al compound (ii) is a mixture including trialkylaluminums. In some embodiments, the Al/Ti ratio is greater than 1, alternatively between 50 and 2000.

In some embodiments, the external electron-donor compounds are selected from the group consisting of silicon compounds, ethers, esters, amines, heterocyclic compounds, and ketones. In some embodiments, the heterocyclic compound is 2,2,6,6-tetramethylpiperidine.

In some embodiments, the external donor compounds are silicon compounds of formula $(R_6)_a(R_7)_bSi(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms. In some embodiments, the external electron-donor compounds are the silicon compounds wherein a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group. In some embodiments, $R_8$ is methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)-(2-ethylpiperidinyl)-dimethoxysilane, and methyl(3,3,3-trifluoro-n-propyl)dimethoxysilane. In some embodiments, the external electron-donor compounds are the silicon compounds wherein a is 0, c is 3, $R_7$ is a branched alkyl or cycloalkyl group, optionally containing heteroatoms, and $R_8$ is methyl. In some embodiments, the silicon compounds are selected from the group consisting of cyclohexyltrimethoxysilane, t-butyltrimethoxysilane, and thexyltrimethoxysilane.

In some embodiments, the electron donor compound (iii) is used in such an amount to give a molar ratio between the alkylaluminum compound and the electron donor compound (iii) of from 0.1 to 500, alternatively from 1 to 300, alternatively from 3 to 100.

In some embodiments, the polypropylene composition is further made from or containing additives. In some embodiments, the additives are selected from the group consisting of anti-oxidants, process stabilizers, slip agents, antistatic agents, antiblock agents, antifog agents, and nucleating agents.

The following examples are given to illustrate, not to limit, the present disclosure:

EXAMPLES

Xylene-soluble (XS) Fraction at 25° C.

Xylene Solubles at 25° C. were determined according to ISO 16 152; with solution volume of 250 ml, precipitation at 25° C. for 20 minutes, 10 of which with the solution in agitation (magnetic stirrer), and drying at 70° C.

Melt Flow Rate (MFR)

Measured according to ISO 1133 at 230° C. with a load of 2.16 kg, unless otherwise specified.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter, which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Determination of the Haze

Injection molded specimens, prepared according to ISO 1873-2, and ISO 294, were used. The haze value was measured using a Gardner photometric unit connected to a Hazemeter type UX-10 or an equivalent instrument having G.E. 1209 light source with filter "C". Standard samples were used for calibrating the instrument according to.

Flexural Modulus

Determined according to ISO 178 and supplemental condition according to ISO 1873-2 with specimen injection molded.

Charpy

Charpy impact test according to ISO 179-1eA, e ISO 1872-2.

Ethylene Content in the Copolymers

$^{13}$C NMR spectra were acquired on a Bruker AV-600 spectrometer equipped with cryoprobe, operating at 160.91 MHz in the Fourier transform mode at 120° C.

The peak of the Sop carbon (nomenclature according to "Monomer Sequence Distribution in Ethylene-Propylene Rubber Measured by $^{13}$C NMR. 3. Use of Reaction Probability Mode" C. J. Carman, R. A. Harrington and C. E. Wilkes, Macromolecules, 1977, 10, 536) was used as an internal standard at 29.9 ppm. The samples were dissolved in 1,1,2,2-tetrachloroethane-d2 at 120° C. with an 8% wt/v concentration. Each spectrum was acquired with a 900 pulse, and 15 seconds of delay between pulses and CPD, thereby removing [1]H-$^{13}$C coupling. 512 transients were stored in 32K data points using a spectral window of 9000 Hz.

The assignments of the spectra, the evaluation of triad distribution, and the composition were made according to Kakugo ("Carbon-13 NMR determination of monomer sequence distribution in ethylene-propylene copolymers prepared with 6-titanium trichloride-diethylaluminum chloride" M. Kakugo, Y. Naito, K. Mizunuma and T. Miyatake, Macromolecules, 1982, 15, 1150) using the following equations:

$$PPP=100\ T\beta\beta/S$$

$$PPE=100\ T\beta\delta/S$$

$$EPE=100\ T\delta\delta/S$$

$$PEP=100\ S\beta\beta/S$$

$$PEE=100\ S\beta\delta/S$$

$$EEE=100\ (0.25\ S\gamma\delta+0.5\ S\delta\delta)/S$$

$$S=T\beta\beta+T\beta\delta+T\delta\delta+S\beta\beta+S\beta\delta+0.25\ S\gamma\delta+0.5\ S\delta\delta$$

The molar percentage of ethylene content was evaluated using the following equation:

$$E\ \%\ mol=100*[PEP+PEE+EEE]$$

The weight percentage of ethylene content was evaluated using the following equation:

$$E\ \%\ mol*MWE$$

$$E\ \%\ wt.=E\ \%\ mol*MWE+P\ \%\ mol*MWP$$

where P % mol is the molar percentage of propylene content while MWE and MWP are the molecular weights of ethylene and propylene, respectively.

The product of reactivity ratio r1r2 was calculated according to Carman (C. J. Carman, R. A. Harrington and C. E. Wilkes, Macromolecules, 1977; 10, 536) as:

$$r_1r_2 = 1 + \left(\frac{EEE+PEE}{PEP}+1\right) - \left(\frac{P}{E}+1\right)\left(\frac{EEE+PEE}{PEP}+1\right)^{0.5}$$

The tacticity of Propylene sequences was calculated as mm content from the ratio of the PPP mmTββ (28.90-29.65 ppm) and the whole Tββ (29.80-28.37 ppm).

Determination of Mg, Ti

The determination of Mg and Ti content in the solid catalyst component was carried out via inductively coupled plasma emission spectroscopy on "I.C.P Spectrometer ARL Accuris".

The sample was prepared by analytically weighing, in a "Fluxy" platinum crucible", 0.1÷0.3 grams of catalyst and 2 grams of lithium metaborate/tetraborate 1/1 mixture. After addition of some drops of KI solution, the crucible was inserted in a "Claisse Fluxy" for the complete burning. The residue was collected with a 5% v/v HNO₃ solution and then analyzed via ICP at the following wavelengths: Magnesium, 279.08 nm; Titanium, 368.52 nm.

Determination of Bi

The determination of Bi content in the solid catalyst component was carried out via inductively coupled plasma emission spectroscopy on "I.C.P Spectrometer ARL Accuris".

The sample was prepared by analytically weighing in a 200 cm³ volumetric flask 0.1÷0.3 grams of catalyst. After slow addition of both about 10 milliliters of 65% v/v HNO₃ solution and about 50 cm³ of distilled water, the sample underwent a digestion for 4÷6 hours. Then the volumetric flask was diluted to the mark with deionized water. The resulting solution was directly analyzed via ICP at the following wavelength: Bismuth, 223.06 nm.

Determination of Internal Donor Content

The determination of the content of internal donor in the solid catalytic compound was done through gas chromatography. The solid component was dissolved in acetone, an internal standard was added, and a sample of the organic phase was analyzed in a gas chromatograph, thereby determining the amount of donor present at the starting catalyst compound.

Examples 1—Preparation of the Ziegler-Natta Solid Catalyst

Procedure for the Preparation of the Spherical Adduct

Microspheroidal $MgCl_2.pC_2H_5OH$ adduct was prepared according to the method described in Comparative Example 5 of Patent Cooperation Treaty Publication No. WO98/44009, with the difference that $BiCl_3$ in a powder form and in an amount of 3 mol % with respect to the magnesium was added before feeding the oil.

Procedure for the Preparation of the Solid Catalyst Component

Into a 500 ml round bottom flask, equipped with mechanical stirrer, cooler and thermometer, 300 ml of $TiCl_4$ were introduced at room temperature under a nitrogen atmosphere. After cooling to 0° C., 9.0 g of the spherical adduct were added while stirring. Then, diethyl 3,3-dipropylglutarate was sequentially added into the flask. The amount of charged internal donor was to meet a Mg/donor molar ratio of 13. The temperature was raised to 100° C. and maintained for 2 hours. Thereafter, stirring was stopped; the solid product was allowed to settle, and the supernatant liquid was siphoned off at 100° C.

After siphoning, fresh $TiCl_4$ and an amount of 9,9-bis (methoxymethyl)fluorene for producing a Mg/diether molar ratio of 13 were added. The mixture was then heated at 120° C. and maintained at this temperature for 1 hour under stirring. Stirring was stopped again. The solid was allowed to settle. The supernatant liquid was siphoned off. The solid was washed with anhydrous hexane six times in a temperature gradient down to 60° C. and one time at room temperature. The solid was then dried under vacuum and analyzed.

Prepolymerization Treatment

Before introducing the solid catalyst component into the polymerization reactors, the solid catalyst component was contacted with triethylaluminum (TEAL) and dicyclopentyldimethoxysilane (DCPMS, D donor) in a ratio reported in Table 1.

Polymerization

The polymerization of component A) was carried out continuously in a series of two reactors equipped with devices to transfer the product from the first reactor to the second reactor. The polymerization was carried out in gas-phase polymerization reactor having two interconnected polymerization zones, a riser, and a downcomer. No "barrier stream" was used.

The polymer (A) coming from the first reactor was discharged in a continuous flow. After the polymer (A) was purged of unreacted monomers, the polymer (A) was introduced, in a continuous flow, into the second stirred bed gas phase reactor. In the second reactor, a copolymer of ethylene (B) was produced.

Quantities of monomers and hydrogen fed to the polymerization reactor are reported in Table 1.

Comparative Example 2

Preparation of the Ziegler-Natta Solid Catalyst

Microspheroidal $MgCl_2.2.1$ $C_2H_5OH$ adduct was prepared according to Example 1 of European Patent Application No. 728769. The solid catalyst component was prepared according to Example 1 of European Patent Application No. 728769.

Before introducing the solid catalyst component into the polymerization reactors, the solid catalyst component was contacted with triethylaluminum (TEAL) and dicyclopentyldimethoxysilane (DCPMS, D donor) in a ratio reported in Table 1.

The polymerization was carried out as in Example 1. The data are reported in Table 1.

TABLE 1

| | | Example | |
| | | 1 | Comp 2 |
| --- | --- | --- | --- |
| PRECONTACT | | | |
| Temperature | ° C. | 15 | 15 |
| Residence Time | min | 14 | 15 |
| TEAL/catalyst | wt/wt | 5 | 6 |
| TEAL/Ext. Donor | g/g | 20 | 30 |
| PREPOLYMERIZATION | | | |
| Temperature | ° C. | 20 | 30 |
| Residence Time | min | 9 | 13 |
| hydrogen | ppm | 0 | 228 |
| POLYMERIZATION Gas loop | | | |
| Temperature | bar-g | 68 | 69 |
| Pressure | bar-g | 28 | 28 |
| Residence Time | min | 65 | 79 |
| $H_2/C_3$ riser | mol/mol | 0.105 | 0.013 |
| Split | Wt % | 90 | 90 |
| Gas phase reactor | | | |
| $H_2/C2^{--}$ | mol/mol | 0.552 | 0.177 |
| C2/C2 + C3 | mol/mol | 0.088 | 0.15 |
| Split | Wt % | 10 | 10 |

C3 propylene, C2 ethylene H2 hydrogen

The properties of the polymer of example 1 and comparative example 2 are reported in Table 2.

TABLE 2

| | | Ex 1 | Comp ex 2 |
| --- | --- | --- | --- |
| Component A | | | |
| MFR | g/10 min | 170 | 150 |
| Xs | Wt % | 1.8 | 2.6 |
| split | Wt % | 90 | 90 |
| Component B | | | |
| split | Wt % | 10 | 10 |
| Total composition | | | |
| Ethylene content | Wt % | 2.8 | 2.7 |
| XS | Wt % | 10.8 | 13 |
| Intrinsic viscosity xylene solubles 25° C. | dl/g | 1.4 | 1.5 |
| Ethylene in the fraction insoluble in xylene at 25° C. | Wt % | 1.52 | 1.23 |
| Ethylene in the fraction soluble in xylene at 25° C. | Wt % | 19.40 | 22.62 |

TABLE 2-continued

| | | Ex 1 | Comp ex 2 |
| --- | --- | --- | --- |
| PEE sequences in the fraction soluble in xylene at 25° C. | Mol % | 8.98 | 11.68 |
| PPE sequences | Mol % | 4.51 | 2.89 |
| PEE sequences in the fraction soluble in xylene at 25° C. | Mol % | 9.7 | 12.7 |
| EEE sequences in the fraction soluble in xylene at 25° C. | Mol % | 4.8 | 8.4 |
| r1r2 | | 2.48 | 2.34 |
| Characterization | | | |
| Tens mod | MPa | 1470 | 1470 |
| Charpy 23° C. | $Kj/m^2$ | 3.6 | 3.4 |
| Haze | | 22 | 53 |

What is claimed is:

1. A polypropylene composition comprising:

A) from 80 wt % to 96 wt %, of a propylene homopolymer, based upon the total weight of the polypropylene composition, having a fraction insoluble in xylene at 25° C. greater than 90 wt %, based upon the total weight of the propylene homopolymer; and a melt flow rate, MFR, measured according to ISO 1133 at 230° C. with a load of 2.16 kg between 80.0 g/10 min and 300.0 g/10 min; and B) From 4 wt % to 20 wt %; from 4 wt % to 20 wt %, of a propylene ethylene copolymer, based upon the total weight of the polypropylene composition, having an ethylene derived units content ranging from 18 wt % to 38 wt %, based upon the total weight of the propylene ethylene copolymer;

wherein the polypropylene composition has:

i) a xylene soluble fraction at 25° C. ranging from 5 wt % to 13.0 wt %, based upon the total weight of the polypropylene composition;

ii) an ethylene derived units content on the fraction insoluble in xylene at 25° C. ranging from 0.5 wt % to 3.5 wt %;

iii an ethylene derived units content on the fraction soluble in xylene at 25° C. ranging from 17.2 wt % to 27.0 wt %;

iv) the $^{13}$C NMR sequences PPE of the composition ranging from 3.50 mol % to 5.65 mol % and the $^{13}$C NMR sequences PEE measured on the fraction soluble in xylene at 25° C. ranging from 7.85 mol % to 11.00 mol %;

(v) a melt flow rate, MFR, measured according to ISO 1133 at 230° C. with a load of 2.16 kg, between 80.0 g/10 min and 150.0 g/10 min;

the sum of the amounts of A) and B) being 100 wt %; and (vi) an intrinsic viscosity measured on the fraction soluble in xylene at 25° C. ranging from 0.9 to 2.3 dl/g.

2. The polypropylene composition according to claim 1, wherein the propylene composition comprises from 85 wt % to 95 wt % of component A), based upon the total weight of the polypropylene composition, and from 5 wt % to 15 wt % of component B), based upon the total weight of the polypropylene composition.

3. The polypropylene composition according to claim 1, wherein the xylene soluble fraction at 25° C. ranges from 6 wt % to 12 wt %, based upon the total weight of the polypropylene composition.

4. The polypropylene composition according to claim 1, wherein, in component A), the melt flow rate, MFR, measured according to ISO 1133 at 230° C. with a load of 2.16 kg is between 100.0 g/10 min and 250.0 g/10 min.

5. The polypropylene composition according to claim 1, wherein, in component B), the melt flow rate, MFR, measured according to ISO 1133 at 230° C. with a load of 2.16 kg, ranges from 90.0 g/10 min and 130.0 g/10 min.

6. The polypropylene composition according to claim 1, wherein the ethylene derived units content on the fraction insoluble in xylene at 25° C. ranges from 0.8 wt % to 2.5 wt %.

7. The polypropylene composition according to claim 1, wherein the ethylene derived units content on the fraction soluble in xylene at 25° C. ranges from 17.8 wt % to 21.3 wt %.

8. The polypropylene composition according to claim 1, wherein the $^{13}$C NMR sequences PPE range from 3.80 mol % to 5.00 mol % and the $^{13}$C NMR sequences PEE measured on the fraction soluble in xylene at 25° C. range from 8.00 mol % to 10.80 mol %.

9. The polypropylene composition according to claim 1, wherein the melt flow rate, MFR, measured according to ISO 1133 at 230° C. with a load of 2.16 kg is between 90.0 g/10 min and 130.0 g/10 min.

10. The polypropylene composition according to claim 1, wherein the propylene composition comprises from 93 wt % to 87 wt % of component A), based upon the total weight of the polypropylene composition, and from 7 wt % to 13 wt % of component B), based upon the total weight of the polypropylene composition.

11. The polypropylene composition according to claim 1, wherein the xylene soluble fraction at 25° C. ranges from 7 wt % to 11 wt %, based upon the total weight of the polypropylene composition.

12. The polypropylene composition according to claim 1, wherein, in component A), the melt flow rate, MFR, measured according to ISO 1133 at 230° C. with a load of 2.16 kg is between 150.0 g/10 min and 220.0 g/10 min.

13. The polypropylene composition according to claim 1, wherein, in component B), the melt flow rate, MFR, measured according to ISO 1133 at 230° C. with a load of 2.16 kg, ranges from 95.0 g/10 min and 120.0 g/10 min.

14. The polypropylene composition according to claim 1, wherein the intrinsic viscosity measured on the fraction soluble in xylene at 25° C. ranges from 1.1 to 2.0 dl/g.

15. An injection molded article comprising the propylene composition according to claim 1.

* * * * *